Oct. 11, 1938.  W. W. LAWRENCE  2,132,692
LOCKING MEANS FOR DIFFERENTIALS
Filed Oct. 22, 1936  5 Sheets-Sheet 4
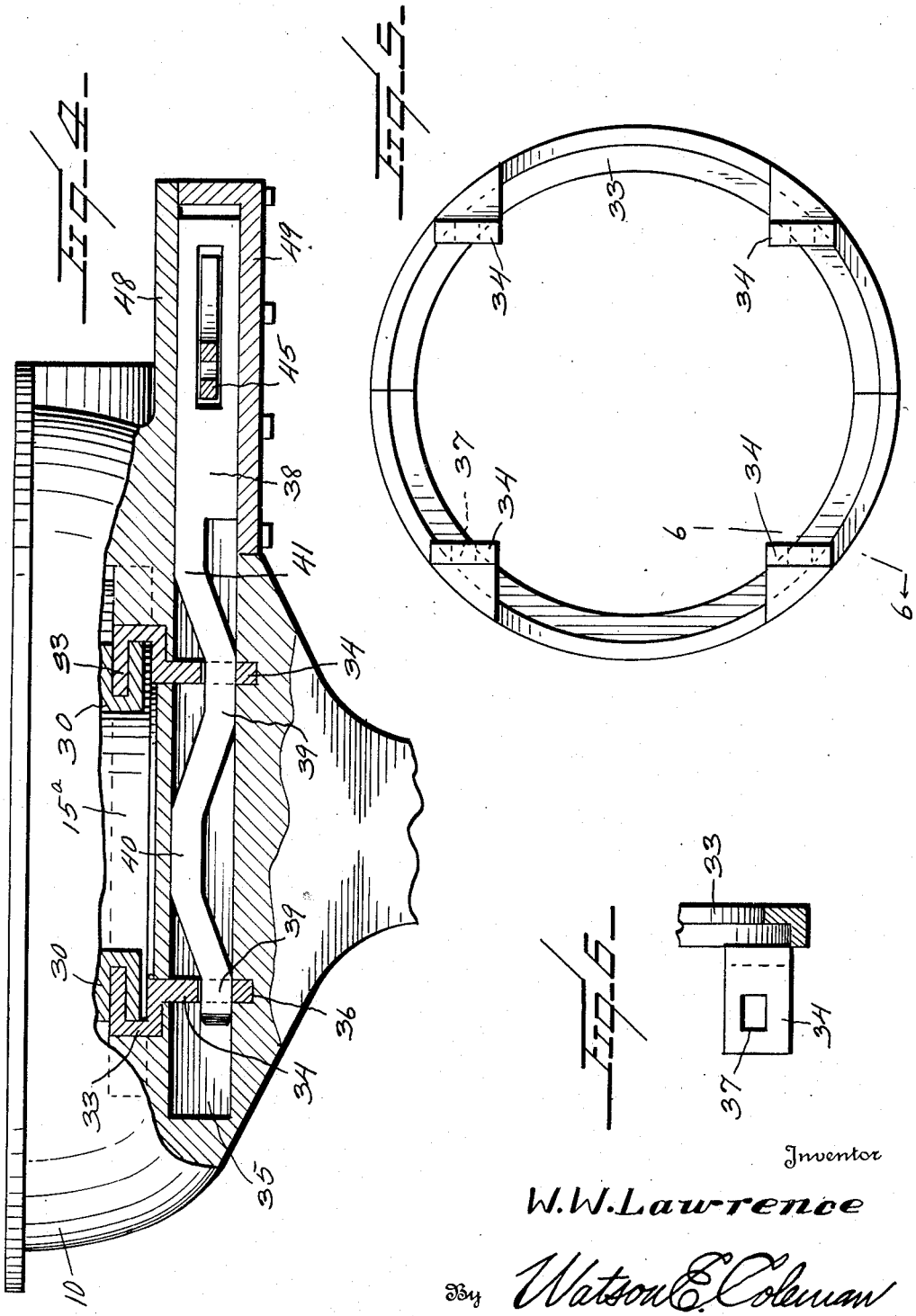
Inventor
W. W. Lawrence
By Watson E. Coleman
Attorney Oct. 11, 1938. W. W. LAWRENCE 2,132,692
LOCKING MEANS FOR DIFFERENTIALS
Filed Oct. 22, 1936  5 Sheets-Sheet 5
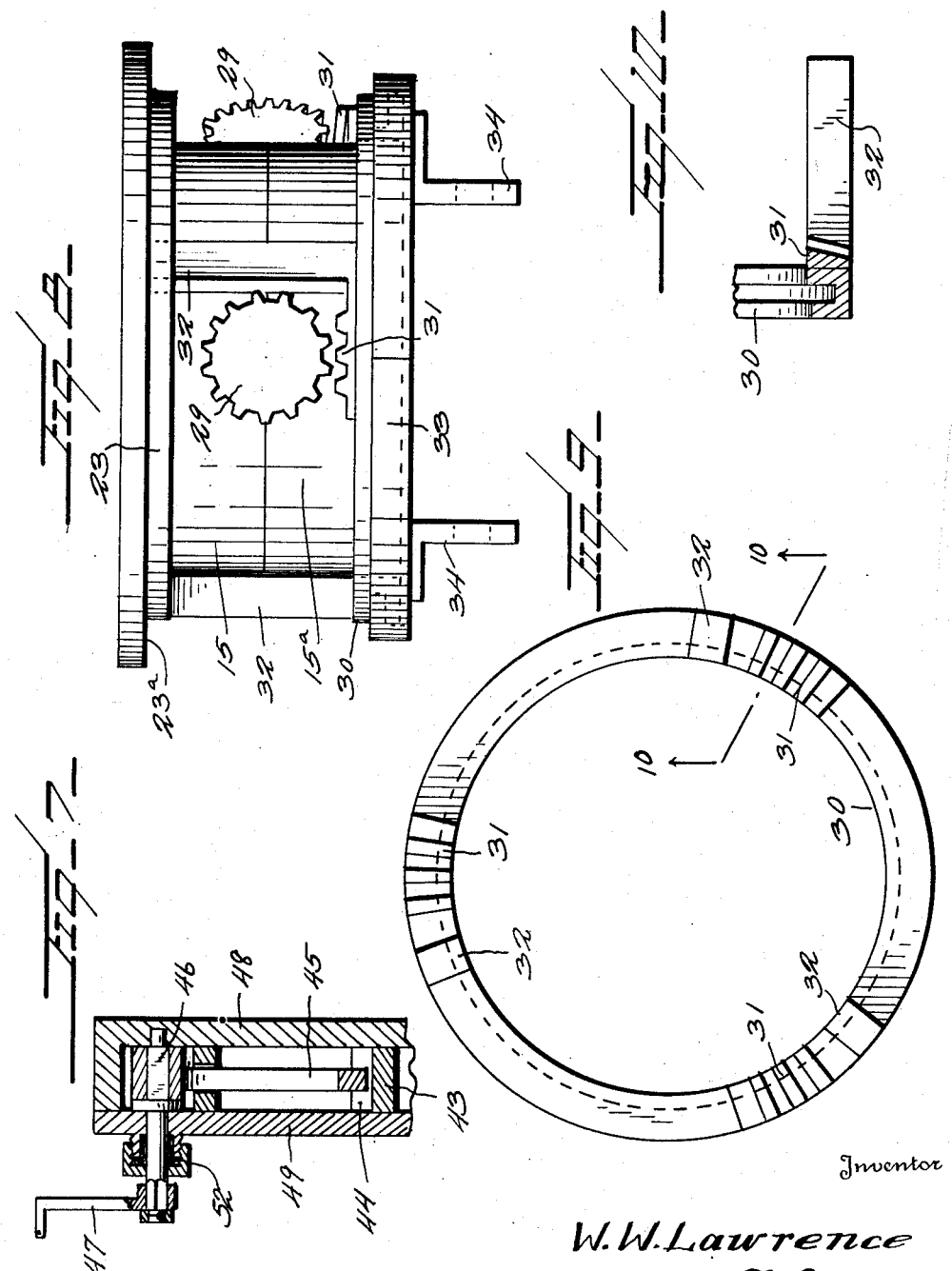
Inventor
W. W. Lawrence
By Watson E. Coleman
Attorney Patented Oct. 11, 1938

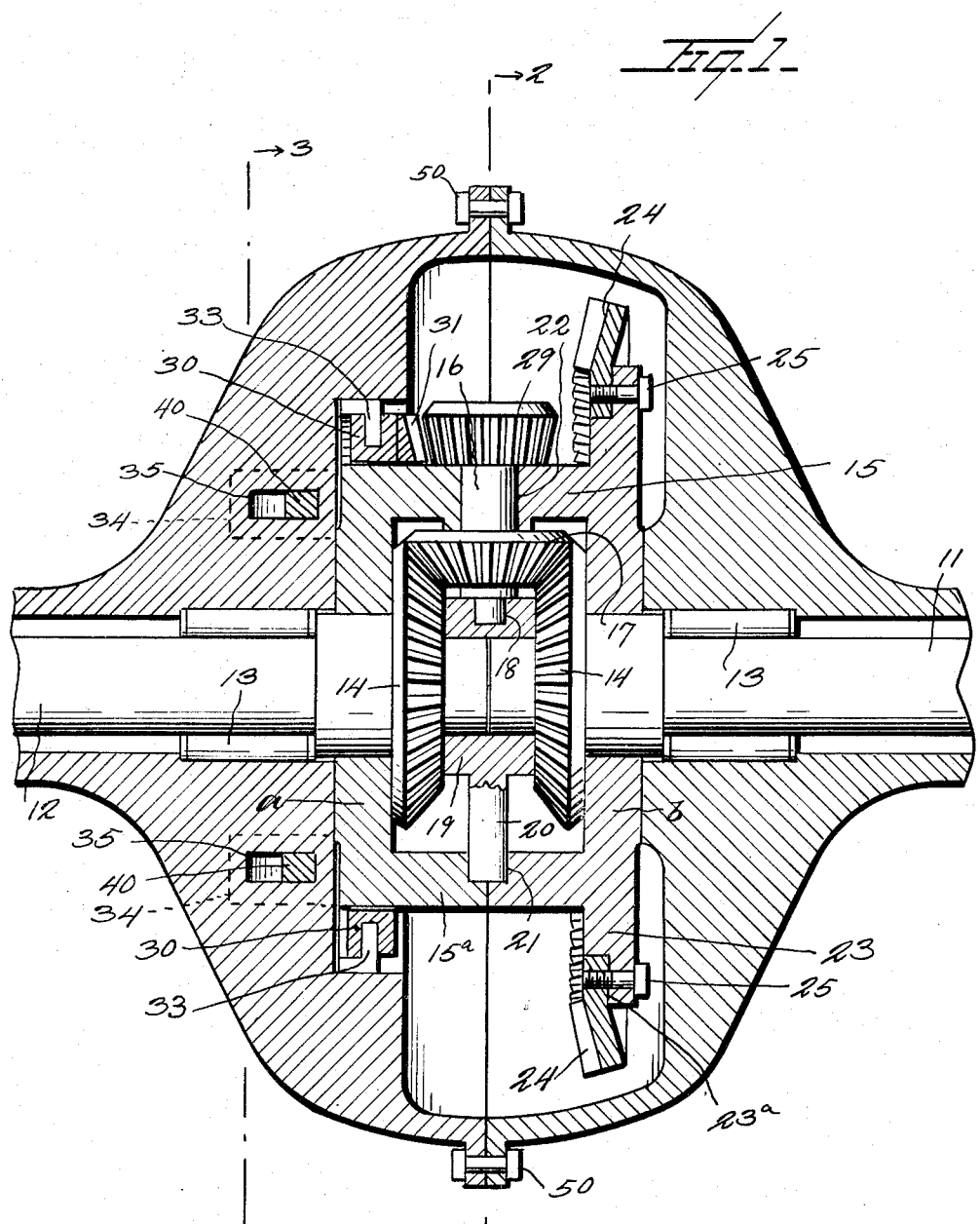

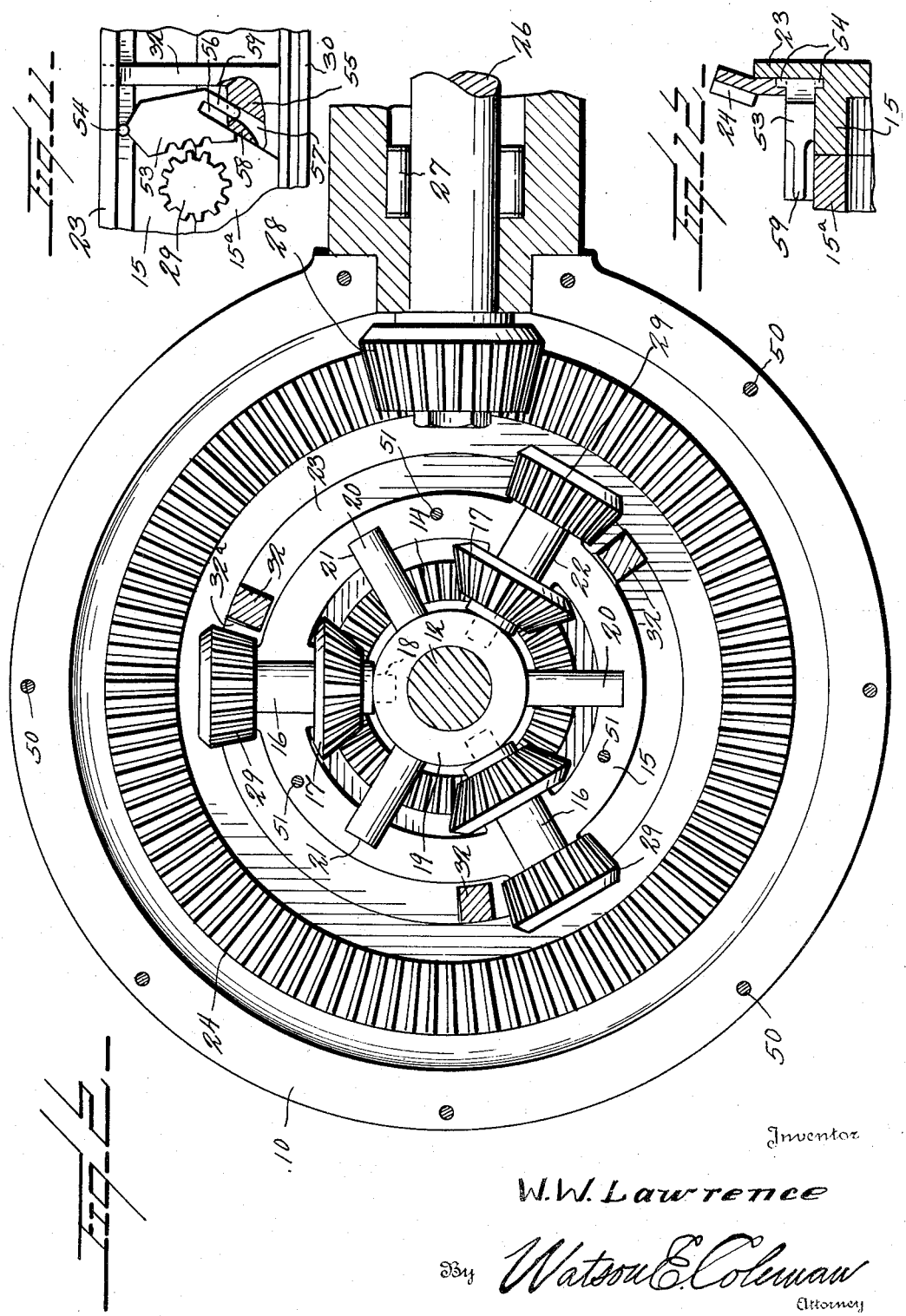

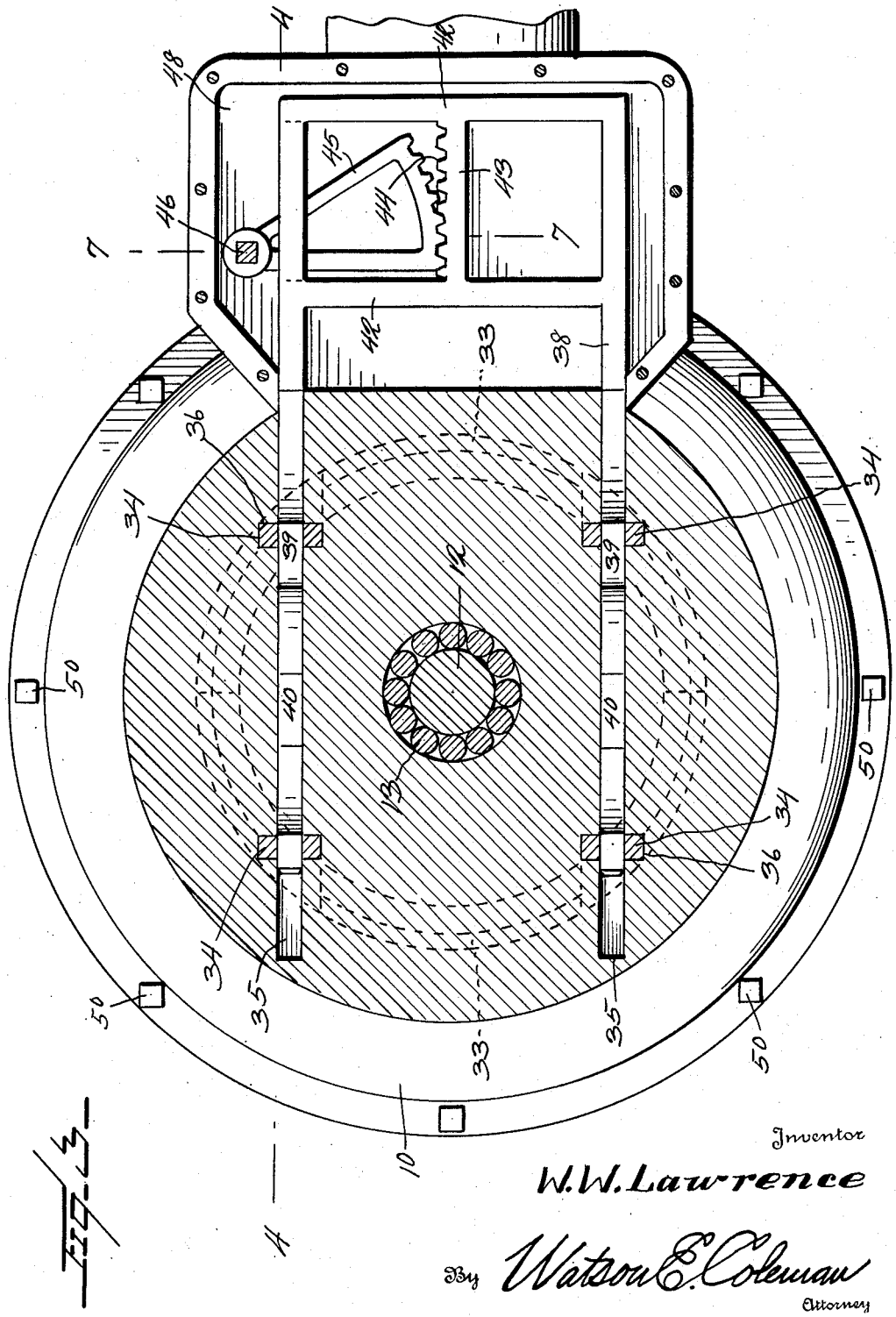

2,132,692

UNITED STATES PATENT OFFICE 2,132,692

LOCKING MEANS FOR DIFFERENTIALS

Willard W. Lawrence, Patoka, Ill.

Application October 22, 1936, Serial No. 107,100

10 Claims. (Cl. 74—316)

This invention relates to motor operated vehicles and particularly to the differential thereof. Differential mechanism is so constructed as to permit one wheel to revolve at a different speed from its mate or to stand still while its mate is rotating. It often happens that one wheel has, therefore, little power while the other wheel has many times the tractive force required. Very often, under these circumstances, as for instance, where one wheel is operating in mud, the engine cannot move the car, the one wheel in the mud operating with great rapidity while the other wheel stands still.

The object of my invention is to provide a mechanism whereby all of the tractive power of both wheels may be utilized in an emergency, this mechanism acting to stop the usual differential action and thereby produce the same effect as if the driving axle were in one piece or section instead of two.

Another object is to provide means which will lock the differential pinion or pinions against turning movement.

A further object is to provide a mechanism of this kind which is very simple, which may be readily put into operation and which will not require any vital changes to be made in the differential mechanism as used today.

Other objects will appear in the course of the following description.

My invention is illustrated in the accompanying drawings wherein:

Figure 1 is a horizontal section through a differential housing and differential mechanism enclosed therein.

Figure 2 is a section on the line 2—2 of Figure 1.

Figure 3 is a section on the line 3—3 of Figure 1.

Figure 4 is a fragmentary top plan view with parts broken away to show the actuating means for my structure.

Figure 5 is a face view of the stop actuating ring.

Figure 6 is a fragmentary section on the line 6—6 of Figure 5.

Figure 7 is a fragmentary section on the line 7—7 of Figure 3.

Figure 8 is an elevation of the differential frame with the actuating ring applied thereto.

Figure 9 is a face view of the actuating ring.

Figure 10 is a section on the line 10—10 of Figure 9.

Figure 11 is a fragmentary elevation of the differential frame with the locking ring thereon and a swinging dog for locking the pinions of the differential.

Figure 12 is a fragmentary sectional view through a portion of the differential frame showing the manner of mounting the locking dog shown in Figure 11.

In these drawings, 10 designates the usual sectional housing for the drive axle of the machine as, for instance, the rear axle. This housing supports within it the two shaft sections 11 and 12 supported in bearings 13 and carrying the usual confronting beveled gear wheels 14. Within the housing is a differential frame 15 which is normally rotatable around the axes of the shafts 11 and 12 and carries a plurality of pinion shafts 16, each carrying a beveled pinion 17 meshing with the opposed beveled gears 14, as usual. A spider 19 surrounds the inner ends of the shafts 11 and 12 and forms a bearing 18 for the inner ends of the shafts 16, the spider being held in rotative engagement with the cylindrical portion 15a by the radially projecting pins 20. The frame 15 is made in two sections a and b and the pins 20 fit in sockets 21 formed at the juncture of the two sections, while the shaft 16 extends through bearings 22 formed at the juncture of theses two sections. The section b has a flange 23 recessed on its inner face, as at 23a, to form a seat for a beveled gear ring 24 held in place by screws 25.

The drive shaft 26 extends into the differential housing through a bearing 27 and carries the usual beveled gear wheel 28 meshing with the gear ring 24.

So far, I have described a structure which embodies in effect the usual differential which operates in the usual manner to allow one driven shaft to run faster or slower than its opposed driven shaft.

As before stated, my invention resides particularly in the provision of means whereby the differential pinion 17 may be locked from rotation. To this end, in one form of my invention, which is a very simple form, I mount upon the outwardly extending end of each pinion shaft 16 the slightly beveled integral pinions 29 which rotate axially with the respective shafts. Disposed outward of the pinions 29 and carried on the cylindrical portion 15a of the frame is a ring 30 whose peripheral face is channeled. The inner face of this ring is provided, at as many points as there are pinions 29, with the locking teeth 31, which are beveled outwardly and laterally to fit against the undercut bevel of pinions 29 (see Figure 1). I have shown the rack teeth 31 as being a separate piece from but welded to the ring 30 and the ring having attached thereto the laterally projecting bars or fingers 32, which extend into apertures formed in the confronting face of the flange 23, as shown in Figures 2 and 8. I have shown three teeth 31 associated with each pinion 29, but I do not wish to be limited to this number of teeth, as the only purpose of the teeth 31 is to mesh with the teeth of the pinion 29 and lock this pinion from rotative movement.

The ring 30 is shiftable toward and away from the pinions 29 and to this end I provide, as shown best in Figures 4, 5 and 6, an annular ring-engaging member 33 having a flange which engages within the channel of the ring 30, as shown in Figure 1, this flange being provided with four laterally projecting lugs 34 which, as shown in Figure 4, extend laterally through the housing 10 and into passages 35, these passages being tangential to a circle whose center is the axial center of the shaft 12. The extremities of the shanks 34 extend into recesses 36 formed in the outer wall of each passage, as shown in Figure 4, so that these shanks will be guided for rectilinear movement. The shanks are disposed in pairs, there being a pair of shanks for each tangential passage 35. The shanks are apertured at 37, as shown in Figure 6, and operating within each passage is a rectilinearly movable cam rod 38. This rod has two depressed portions 39 with an intermediate raised portion 40 and a complementary raised portion 41, as shown in Figure 4. It will be obvious now if the cam rod 38 is shifted to the left in Figure 4, that both of the shanks 34 will be shifted inward to shift the ring 30 towards the corresponding pinions 29 and carry the teeth 31 into engagement with these pinions, thus locking the pinions from rotation but that if the rod 38 is shifted to the position shown in Figure 4, that the depressed portions 39 will force the shanks outward and carry the locking ring in the position shown in Figure 1.

For the purpose of securing a unitary motion of these came rods 38, these rods are rigidly connected to each other, as shown in Figure 3, by the cross bars 42. A longitudinal bar 43 is formed with rack teeth 44 and engaging these rack teeth is a toothed segment 45 mounted upon a manually oscillatable shaft 46. This shaft 46, as shown in Figure 7, carries at its outer end a crank 47, whereby the segment 45 may be shifted in one direction or the other. As shown in Figure 3, the outer connected ends of the came rods are disposed within a housing 48 closed on one side by a removable plate 49 (see Figure 4). It will be seen that upon a rotation of the crank 47 in one direction, the locking ring 30 will be shifted inward to carry the teeth 31 into engagement with the pinions 29 and locking these pinions from rotation and thus locking the differential mechanism from rotation so that the differential rotates as a unit, with the two shafts 11 and 12, as if the shafts 11 and 12 were one shaft driven by the bevel gear wheel 28. On the other hand, when the gear is operated to retract the cam rods 38, the beveled pinions 29 are unlocked and the beveled pinions 17, therefore, rotate in the usual manner and secure the differential action between the two shafts 11 and 12.

The bolts 50, as shown in Figure 1, hold the two sections of the housing together and the bolts 51, as usual, hold the two sections $a$ and $b$ of the differential frame together.

It will be seen that by removing the bolts 50 and the bolts 51, the housing 10 may be separated and then one half of the frame 15 be separated from the other half, and thus the pinions and shafts may be readily removed or replaced.

It will also be seen that the housing 48 is separable and that the only opening in this housing, when the two sections of the housing 48 are brought together is the opening closed by the stuffing box 52 through which the shaft 46 passes. Thus there is no chance for lubricant to leak out.

In Figures 11 and 12, I illustrate a form of locking means which I regard as preferable to that shown in Figures 8 and 9. In this action, a dog 53 engages the teeth of each pinion 29, there being as many dogs as there are pinions 29, and each dog having teeth on the face confronting its corresponding pinion. Each dog has trunions 54 which engage in sockets formed respectively in the frame section 15 and in the base of the gear ring 24, as shown in Figure 12. The shiftable locking ring 30 is mounted, as previously described and as shown in Figures 1, 4 and 8, and carries the guide 32 previously described, but in addition, a lug 55 is formed at the junction of the guide 32 with the ring 30. The dog 53 is formed with a slot 56 which is tangential to a circle concentric to the pinion 29 and the lug is formed with a cam slot 57 which has the inner face of the wall 58 convexly curved, this wall 58 engaging the slot 56. The dog is formed with a finger 59 which projects into the slot 57 and it will be obvious that as the locking ring 30 with its lug 55 is shifted laterally in one direction, the slot 57 engaging the finger 59 will cause the dog 53 to swing inward into locking engagement with the pin 29 and that as the ring 30 is shifted in the opposite direction, the camming action of the walls of the slot 57 will cause the dog to swing laterally away from the pinion 29 and thus release it.

While I have shown the finger 59 as being straight, it is obvious that it might be slightly curved to conform to the curvature of the inner face of the wall 58, and it will be plain that the lateral movement of the lug 55 causes the camming of the dog into or out of engagement with the pinion 29.

While I have illustrated two means for locking the pinion by laterally shifting the actuating or locking ring 30, it is obvious that other means might be used to engage the pinions 29 and lock them against rotation which are capable of being operated by the locking ring 30, and that I do not wish to be limited to the exact mechanism disclosed except insofar as they are defined in the appended claims, and that many minor changes might be made in the mechanism without departing from the spirit of the invention as defined in said claims.

What is claimed is:

1. In a differential having a housing, a differential frame rotatable within the housing and having a plurality of radially disposed pinion shafts, pinions mounted upon said shafts exteriorly of the frame, a locking ring surrounding one end of the frame and having rotative engagement therewith but independently movable toward or from said pinions, the locking ring being peripherally channeled, locking means associated with the pinions operatively engaged by the locking ring and shiftable by said locking ring into or out of engagement with the pinions, an actuating ring having a flange engaging in the channel of the locking ring, the actuating ring being held from rotative movement and having a plurality of laterally extending apertured shanks, a plurality of cam rods rectilinearly movable through the housing, each rod having cam faces engageable with said shanks to shift the shanks inward upon a movement of the cam rod in one direction and outward upon a movement of the cam rod in the other direction, and manually operable means engaging said cam rods to shift them unitarily, said means having a handle on the exterior of the housing.

2. In a differential, including a housing, a frame rotatable within the housing and having radial pinion shafts, pinions carried upon the outer ends of said shaft exteriorly of the frame, a locking ring mounted upon one end of the frame rotatably engaged therewith but shiftable laterally toward or from the pinions, locking means engageable with said pinions and shiftable by the locking ring into a position to engage said pinions to thereby lock the pinion shafts from rotation, a pair of rectilinearly movable cam rods mounted in the housing to one side of the frame, means engaged by said cam rods and engaging the locking ring for shifting the locking ring as the cam rods are shifted in one direction or the other, the cam rods having a connecting yoke connecting the like ends of the cam rods, the housing having a lateral extension within which the yoke operates, a shaft mounted in the wall of said extension and having operative engagement with the yoke to shift it, the shaft having a handle exteriorly of the housing extension whereby it may be operated.

3. In a differential having a housing, a cylindrical differential frame rotatably mounted within the housing, the frame having a flange provided with gear teeth and radial pinion shafts mounted in said frame; pinions mounted upon the exterior ends of said shafts, a channeled ring mounted upon one end of the cylindrical frame, the ring having rods extending across the outer face of the frame and the flange having sockets to receive the ends of said rods, pinion locking means actuated by the locking ring and engageable with said pinions to lock them against rotation when the locking ring is shifted inward, an actuating ring having means engageable in the channel of the locking ring and having shanks extending laterally therefrom, the shanks being apertured, there being two pairs of these shanks, a pair of cam rods mounted within the housing for rectilinear movement therein, the cam rods having two depressed portions and two elevated portions and engageable in the openings in the shanks, and manually operable means having a handle on the exterior of the housing whereby said cam rods may be longitudinally shifted.

4. In a differential having a rotatable cylindrical frame and a plurality of radial pinion shafts mounted in said frame, pinions mounted upon the outer ends of each shaft exteriorly of the frame, a locking ring surrounding the frame, the locking ring being laterally shiftable upon the frame toward or from said pinions, manually operable means operably engaging said locking ring to shift it laterally, a plurality of shiftable dogs one for each of said pinions normally out of engagement with the pinions, and means on the locking ring engaging said dogs and acting to shift the dogs inward against the pinions upon a movement of the locking ring in one direction and to shift the dogs outward away from the pinions upon a movement of the locking pin in the opposite direction.

5. In a differential, a rotatable cylindrical frame and a plurality of radial pinion shafts mounted in said frame, pinions mounted upon the outer end of each shaft exteriorly of the frame, a locking ring surrounding the frame but laterally movable thereon, manually operable means for shifting the locking ring toward or from the pinions, dogs operatively pivoted upon the frame there being a dog for each pinion, each dog being toothed to engage the corresponding pinion, and means carried by the locking ring having camming engagement with the free end of each dog and acting to swing each dog laterally into engagement with the corresponding pinion upon a movement of the locking ring in one direction and acting to positively swing the dogs out of engagement with the pinions upon a movement of the locking ring in the opposite direction.

6. In a differential, a rotatable cylindrical frame and a plurality of radial pinion shafts mounted in said frame, pinions mounted upon the outer end of each shaft exteriorly of the frame, a locking ring surrounding the frame but laterally movable thereon, manually operable means for shifting the locking ring toward or from the pinions, dogs operatively pivoted upon the frame there being a dog for each pinion, each dog being toothed to engage the corresponding pinion, the locking ring having inwardly projecting lugs, one for each dog, the free extremity of the dog being formed to provide a finger and each lug on the locking ring having a slot with which the finger engages, the slot and finger being so formed as to cause each dog to swing inward against the corresponding pinion upon a movement of the locking ring toward the pinion and to swing outward away from the corresponding pinion upon a movement of the locking ring away from said pinion.

7. In a differential having a housing, a differential frame rotatable in the housing and having a plurality of radially disposed pinion shafts, pinions mounted upon said shafts exteriorly of the frame, a locking ring surrounding one end of the frame and rotatable therewith but independently movable laterally toward or from said pinions, the locking ring being peripherally channeled, an actuating ring having a flange engaging in the channel of the locking ring and held from rotating movement with the frame and having a plurality of laterally extending apertured shanks, a plurality of cam rods rectilinearly movable through the housing, each rod having cam faces engageable with said shanks to shift the shanks inward upon a movement of the cam rod in one direction and outward upon a movement of the cam rod in the other direction, manually operable means engaging said cam rods to shift them unitarily, locking dogs pivotally mounted upon the frame for swinging movement toward or from the corresponding pinions, and means on the locking ring engaging said dogs to swing them toward their respective pinions upon a movement of the locking ring toward the pinions and to swing them outward away from the pinions upon a movement of the locking ring away from the pinions.

8. In a differential, a rotatable cylindrical frame and a plurality of radial pinion shafts mounted in said frame, a pinion on the outer end of each shaft and disposed exteriorly of the frame, the frame having an annular exterior flange, a gear ring detachably mounted upon said flange and constituting driving means for the frame, a locking ring surrounding the frame but laterally movable thereon, manually operable means for shifting the locking ring toward or from the pinions, dogs one for each pinion, each dog being toothed to engage the corresponding pinion, each dog having oppositely projecting trunnions, the frame and an opposed portion of the gear ring being recessed to receive said trunnions and provide a pivotal mounting for the dog, the locking ring having inwardly projecting portions adapted to engage the dogs, the dogs and the inwardly projecting portions being so constructed and arranged as to cause each dog to swing inward against the corresponding pinion upon a bodily movement of the locking ring toward the pinions and to swing outward and away from the corresponding pinion upon a movement of the locking ring away from said pinions.

9. In a differential, a housing formed of two lateral detachable sections, a rotatable cylindrical frame concentric to and disposed within the housing and formed of two lateral sections, the housing and the frame being divided along the same plane, driven shaft sections each extending through one of the sections of the housing and the corresponding section of the frame, beveled gear wheels mounted upon the inner portions of the shaft sections, a spider surrounding the inner extremities of the shaft sections but rotatable therearound, the spider having radial pins disposed in the same plane as the plane of separation between the lateral sections of the housing and frame, the pins extending into the frame, a plurality of radial pinion shafts disposed in bearings formed in the confronting faces of the frame sections, the inner ends of said shafts being journaled within the frame, pinions integral with the shafts and carried on the outer and inner ends of the shafts, the inner pinions meshing with the beveled gear wheels, a locking ring supported on the frame for rotation therewith but independently shiftable toward or from the outer pinions, pinion-engaging locking means carried by the ring, and manually operable means for shifting the locking ring toward or from the pinions.

10. In a differential, a housing formed of two lateral detachably connected sections, a rotatable cylindrical frame disposed within and concentric to the housing and formed of two lateral sections, the plane of separation between the sections of the housing being identical with the plane of separation between the sections of the frame, the frame carrying a driving gear wheel, driven shaft sections each extending through one of the sections of the housing and the corresponding section of the frame, beveled gear wheels mounted upon the inner portions of the shaft sections and disposed within the frame, a spider surrounding the inner ends of the shaft sections and within which the shaft sections rotate, the spider having radial members disposed in the same plane as the plane of separation between the lateral sections of the frame, said pins extending into the frame, a plurality of radial pinion shafts disposed in bearings formed in the confronting faces of the frame sections, the inner end of each shaft extending into the spider and being rotatably supported thereby, outer and inner pinions carried on the outer and inner ends of the shafts and integral therewith, the inner pinions meshing with the beveled gear wheels, a locking ring mounted upon the exterior of the frame for unitary rotation therewith but independently shiftable toward or from the outer pinions, the locking ring being disposed on the opposite side of said outer pinions from the gear wheel carried by the frame and laterally extending elements attached to the locking ring extending across the periphery of the frame, the opposed side of the frame being formed to provide sockets into which said elements extend, pinion engaging means carried by the ring, and manually operable means for shifting the locking ring to carry its pinion engaging means into or out of locking engagement with the outer pinions.

WILLARD W. LAWRENCE.